(12) United States Patent
Keylor et al.

(10) Patent No.: US 8,696,244 B2
(45) Date of Patent: Apr. 15, 2014

(54) APPARATUS AND METHOD TO APPLY LIQUID TO SOLID WASTE DISPOSAL SITE

(75) Inventors: Steven Lee Keylor, Somerville, TN (US); Lindsey Shirley, Jr., Pontotoc, MS (US)

(73) Assignee: S&D Technologies, LLC, Pontonoc, MS (US)

( * ) Notice: Subject to any disclaimer, the term of this patent is extended or adjusted under 35 U.S.C. 154(b) by 60 days.

(21) Appl. No.: 13/349,997

(22) Filed: Jan. 13, 2012

(65) Prior Publication Data

US 2012/0183355 A1 Jul. 19, 2012

Related U.S. Application Data

(60) Provisional application No. 61/461,262, filed on Jan. 15, 2011.

(51) Int. Cl.
*B09B 3/00* (2006.01)
(52) U.S. Cl.
USPC .................. 405/129.25; 405/129.95; 37/407
(58) Field of Classification Search
USPC .............. 405/129.25, 129.9, 129.95; 37/409, 37/442–444, 407
See application file for complete search history.

(56) References Cited

U.S. PATENT DOCUMENTS

| | | | | |
|---|---|---|---|---|
| 4,182,679 A | * | 1/1980 | Van Hekle | 210/242.3 |
| 4,519,338 A | * | 5/1985 | Kramer et al. | 118/305 |
| 4,683,826 A | * | 8/1987 | Solie et al. | 111/124 |
| 5,011,330 A | * | 4/1991 | Kittle et al. | 405/129.9 |
| 5,199,196 A | * | 4/1993 | Straley | 37/442 |
| 5,984,580 A | * | 11/1999 | Ham et al. | 405/129.2 |
| 6,558,079 B1 | * | 5/2003 | Kozak et al. | 405/129.15 |
| 6,558,080 B2 | | 5/2003 | Kozak | |
| 7,140,805 B1 | | 11/2006 | Fagan et al. | |
| 7,596,894 B1 | * | 10/2009 | Currey | 37/444 |
| 7,730,649 B1 | * | 6/2010 | Currey | 37/444 |
| 2003/0108394 A1 | * | 6/2003 | Layton et al. | 405/258.1 |
| 2010/0147978 A1 | * | 6/2010 | Vanagosoom | 239/587.2 |
| 2013/0248556 A1 | * | 9/2013 | May | 222/1 |

FOREIGN PATENT DOCUMENTS

KR 10-0589712 7/2006
KR 10-1001437 10/2009

OTHER PUBLICATIONS

PCT Search Report, Aug. 27, 2012.

* cited by examiner

*Primary Examiner* — Benjamin Fiorello
*Assistant Examiner* — Kyle Armstrong
(74) *Attorney, Agent, or Firm* — Harris, Shelton, Hanover & Walsh; Susan B Fentress

(57) ABSTRACT

This invention relates to a method to apply waste treatment liquid to a solid waste disposal site by filing a storage tank with waste treatment liquid, connecting the liquid storage tank with a vehicle for solid waste compacting and releasing the waste treatment liquid to a portion of solid waste site in need of moisture. This invention further provided an apparatus for distributing waste treatment liquid over the working face of a solid waste disposal site includes an inflow conduit, a storage tank, an outflow conduit, a control valve that contains a remote-valve control; manifold inlet conduit attached to the control valve, and a manifold to allow the liquid received from the manifold inlet conduit to be distributed evenly over the working face.

10 Claims, 5 Drawing Sheets

APPARATUS AND METHOD TO APPLY LIQUID TO SOLID WASTE DISPOSAL SITE

CROSS REFERENCE TO RELATED APPLICATIONS

This application claims the benefit of U.S. Provisional Application Ser. No. 61/461,262 filed Jan. 15, 2011 under 35 U.S.C. Section 1.119(e) hereby specifically incorporated by reference in its entirety.

FIELD OF THE INVENTION

This invention relates to apparatus and method to distribute liquid to solid waste disposal sites for compacting and collecting solid waste.

BACKGROUND OF THE INVENTION

In the solid waste industry typically permitted active landfills are used for the disposal of solid waste. The portion of the landfill where waste is actually being unloaded, placed, and compacted is called the "working face" of the landfill. This working face is where waste is placed and compacted by vehicles. Generally these vehicles are track or cleated/chopper wheel driven. These vehicles not only position the waste for efficient air space utilization of land fill capacity but most importantly compact the waste for maximum utilization of the permitted volume. Sub-portions of this permitted volume are most frequently called a "cell" by field personnel.

One of the side effects of this disposal and compacting process is the generation of "leachate". Leachate is the liquid that is hauled in with the waste or rainwater that has fallen on the site, that has come in contact with solid waste. By regulation most landfills are required to collect, treat, and/or dispose of this liquid. This is an added expense to landfill operations. One very effective means to dispose of this liquid is to redistribute leachate on the working face with the new incoming waste stream. Experience has shown that the compaction rate is improved if the incoming waste stream is damp or moist. This dampness will increase the compaction of waste into a smaller volume, thus using less volume of the cell per ton of waste. Furthermore, with this added moisture a greater waste compaction is achieved with less vehicle time, thus requiring fewer passes of the compaction equipment back and forth across the working face. This translates to greater productivity of these vehicles and the use of less fuel per ton of waste compacted.

Landfill leachate is created when precipitation percolates down through the waste deposited at a landfill. Landfill leachate is very high in organics, nitrogen, metals and other toxic materials and is a significant environmental and health concern if released into the environment untreated.

Prior art techniques for leachate disposal on the working face have generally been confined to the use of spray nozzles and portable pumps. This technique frequently requires the presence of assigned personnel to control and direct the leachate distribution. Prior art also uses a pressured nozzle (much like a garden or small fire hose) that shoots the liquid leachate into the air in order to get it to the waste being compacted on the working face. Because of the nozzle and pressure pump there is a fairly solid stream of liquid being propelled from it, and the nozzle also causes some of the liquid (leachate) to be turned into a vapor or mist which potentially could be carried by a breeze where it can settle on nearby earth or vegetation. Furthermore, this mist could cause potential health hazard to personnel working nearby.

Prior art techniques limit the area that can be covered by the sprayed leachate to that reached by the spraying radius of the nozzle. This will cause an uneven distribution of the leachate over the working face waste leaving dry areas and over saturated areas. This would obviously make the compaction uneven and sporadic.

The intended purpose of the present invention is to provide a means to spread a relatively even distribution of liquid (typically site collected leachate) over the entire working face of a solid waste disposal site to improve compaction as well as other benefits.

The present invention would substantially minimize or almost eliminate the misting of the leachate and cause the leachate to be much more evenly distributed over the work surface. It will also add additional weight to the working face vehicle which enhances the compaction rate. In addition, keeping the compactor wheels and cleats as well as the tracks of the dozer damp or wet with leachate will greatly reduce clogging and improve the effectiveness of the compacting process.

Another benefit of the present invention is to minimize fire hazards on the working face waste. The present invention will also minimize the spread rate of any fire if it should occur. Moist or damp waste will obviously not burn as rapidly as dry waste.

An additional benefit of the present invention is the accelerated rate of decomposition of the compacted waste. This will lead to a more rapid generation of methane gas which could be used as a potential energy source.

SUMMARY OF THE INVENTION

This invention provides an apparatus for distributing waste treatment liquid over the working face of a solid waste disposal site. This apparatus includes: an inflow conduit to receive inflow liquid; a storage tank for the liquid received from the inflow conduit; an outflow conduit for the liquid to flow out of the said storage tank; a control valve that contains a remote-valve control, a manifold inlet conduit attached to the control valve to allow liquid to flow through when the control valve opens, and a manifold to allow the liquid received from the manifold inlet conduit to be distributed over the working face of a solid waste disposal site.

This apparatus is used to apply waste treatment liquid to a solid waste disposal site by providing a vehicle for solid waste compacting with a connected liquid storage tank; filling the storage tank with waste treatment liquid; and releasing the waste treatment liquid from the tank to a portion of the site in need of moisture.

DETAILED DESCRIPTION OF THE INVENTION

The present invention may be understood more readily by reference to the following detailed description of the invention. It is to be understood that this invention is not limited to the specific devices, methods, conditions or parameters described herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value unless the context clearly dictates otherwise. Ranges may be expressed herein as from "about" or "approximately" one particular value and/or to "about" or "approximately" another particular value. When such a range is expressed, another embodiment includes one particular value and/or the other particular value. Similarly, when values are expressed as approximations, by use of the antecedent "about," it will be understood that the particular value forms another embodiment.

Unless defined otherwise, all technical terms used herein have the same meaning as commonly understood by one ordinarily skilled in the art to which this invention belongs.

Figure 1:
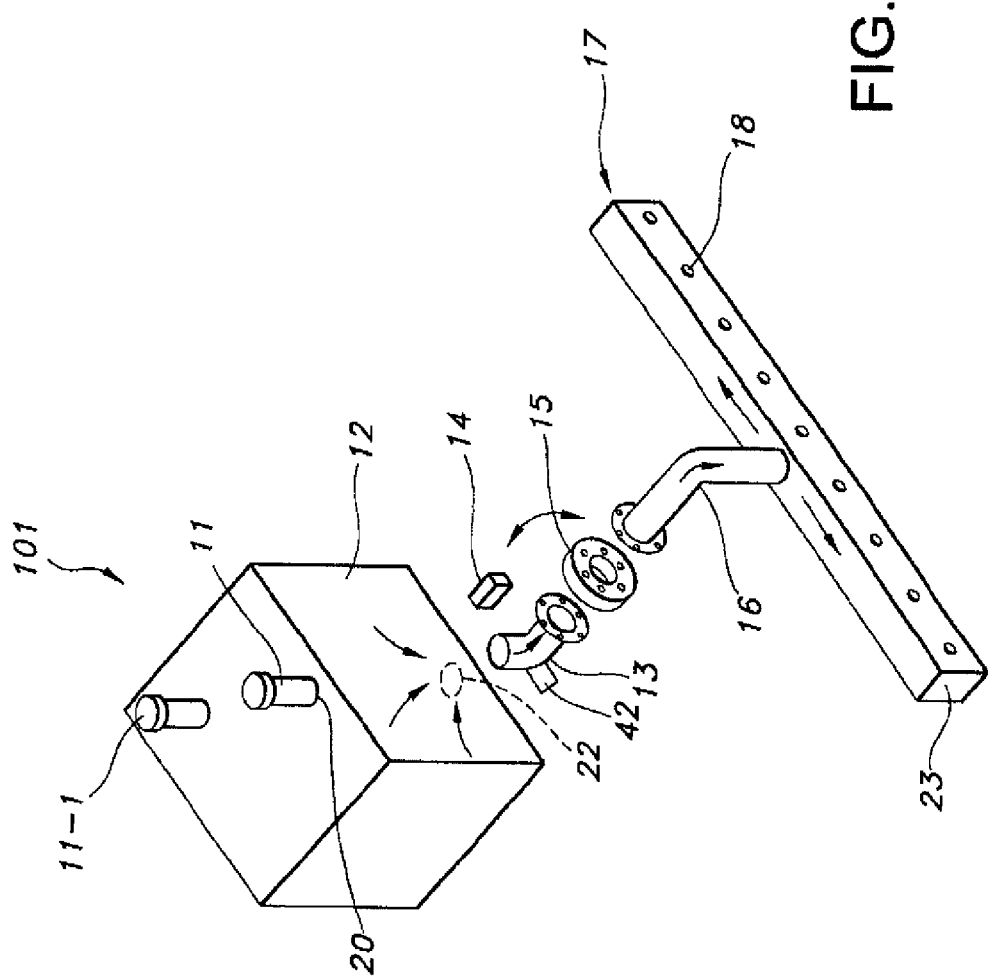
FIG. 1 is a perspective view of an apparatus of the present invention.

Referring now to the drawings, a preferred embodiment of an apparatus 101 for distributing waste treatment liquid over the working face of a solid waste disposal site includes an inflow conduit 11 and/or a vent tube 11-1 on top of a storage tank 12. Liquid flows into the storage tank 12 through inflow conduit 11 and air could flow out through vent tube 11-1 during the storage tank 12 filling. An outflow conduit 13, a remote valve control 14, a control valve 15, a manifold inlet conduit 16, a manifold 17, and a plurality of liquid discharge openings 18 are shown in FIG. 1.

Figure 3:
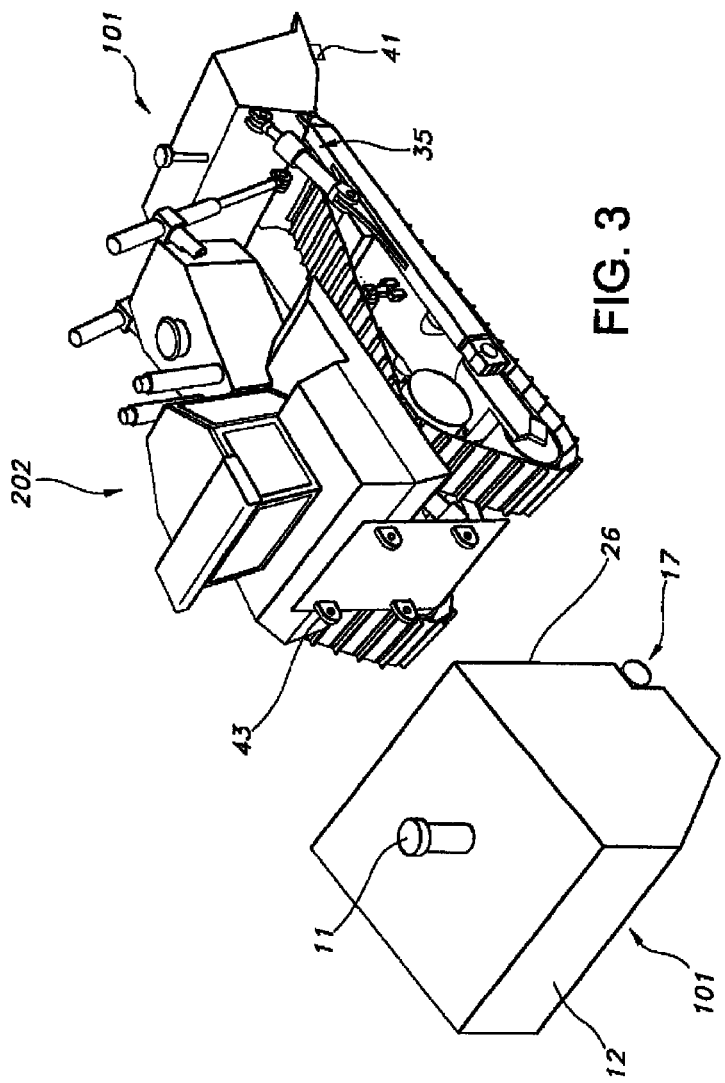
FIG. 3 is a perspective view of an system of the present invention.
Figure 4:
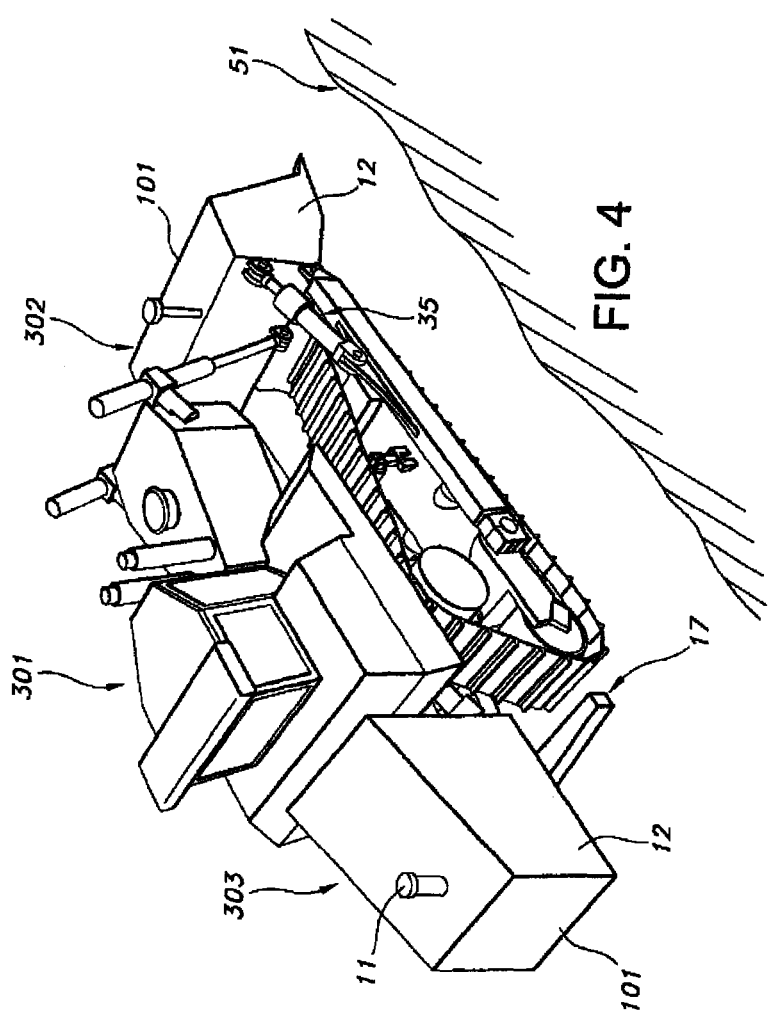
FIG. 4 is a perspective view of a system of the present invention installed in various positions of a track driven machine.
Figure 5:
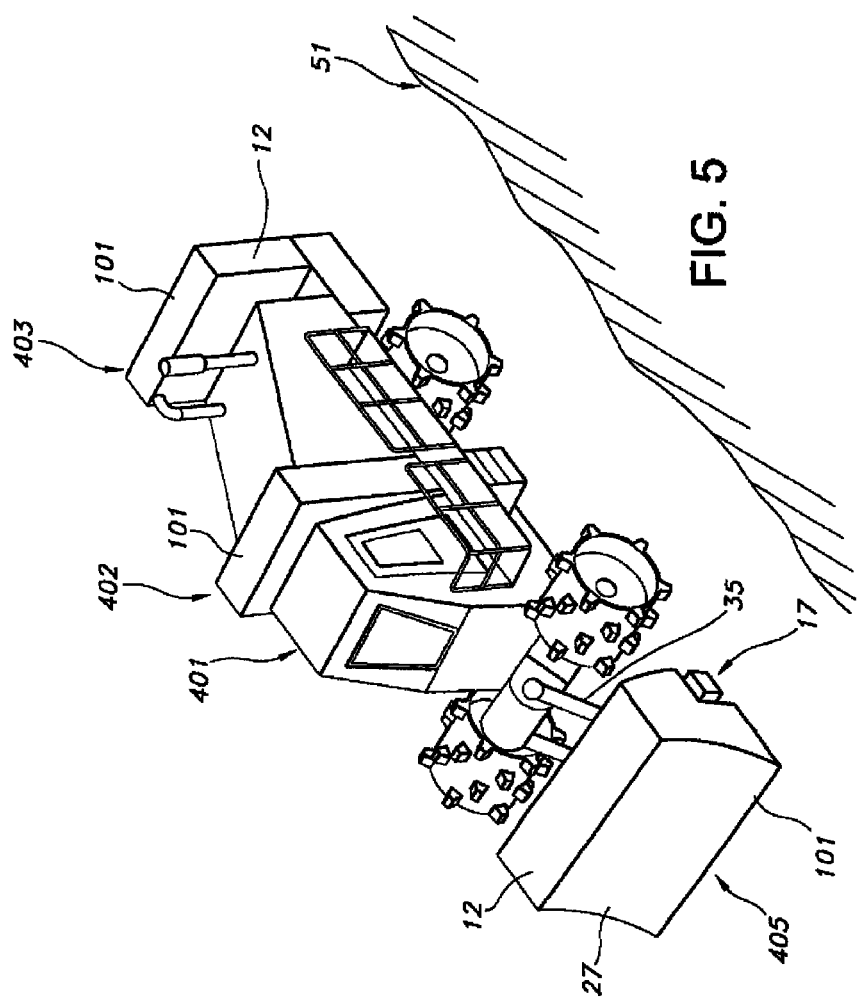
FIG. 5 is a perspective view of the system of the present invention including a wheel driven vehicle that has three positions on which the apparatus can be installed.

The storage tank 12 typically receives the liquid from an inflow conduit 11 at an inlet end 20 and is sized in relation to the various locations of the installation areas as shown in FIGS. 3-5. On the side of the storage tank 12, located substantially near the bottom, an outlet opening 22 is positioned to allow liquid, such as leachate, to gravity feed through an outflow conduit 13. The outflow conduit 13 is attached to a remote valve control 14 which is controlled by a control valve 15 to regulate the outflow of liquid, such as leachate, to a manifold 17 through a manifold inlet conduit 16. The remote valve control 14 can be operated from inside the cab of a vehicle for solid waste compacting or it can be remotely controlled by an infrared sensor 41 coupled to the remote valve control 14. When the control valve 15 is switched on, a liquid, such as leachate, can travel past the valve 15 and is carried by a manifold inlet conduit 16 to a manifold 17. The manifold 17, in one embodiment, is located on the bottom or back side of the storage tank 12.

Next, the liquid flows from the manifold inlet conduit 16 to a distribution head 23. The distribution head 23 distributes the liquid over the solid waste working face 51 through the liquid discharge openings 18. The manifold 17 has liquid discharge openings 18 that allow the leachate to be discharged along the length of the manifold 17. In a preferred embodiment, the manifold liquid discharge openings 18 are configured such that when the control valve 15 is opened the leachate will flow by gravity into the manifold 17 and drain out through the discharge openings 18. In an alternative embodiment, a pump (not shown) can be used in place of gravity feed to move liquid thought the apparatus 101. The storage tank 12 could be equipped with a pump 42 that could be used to pressurize the manifold 17. Alternatively, storage tank 12 could be pressurized using a compressed gas to force the liquid such as leachate into manifold 17 for distribution.

In another preferred embodiment of the invention, the liquid discharge openings 18 are placed such that leachate is distributed over the length of the manifold 17. In a preferred embodiment of the invention, the liquid is applied intermittently and repeatedly. In one embodiment, the manifold 17 is built to the approximate width of the vehicle for solid waste compacting as shown on FIGS. 3-5.

Figure 2:
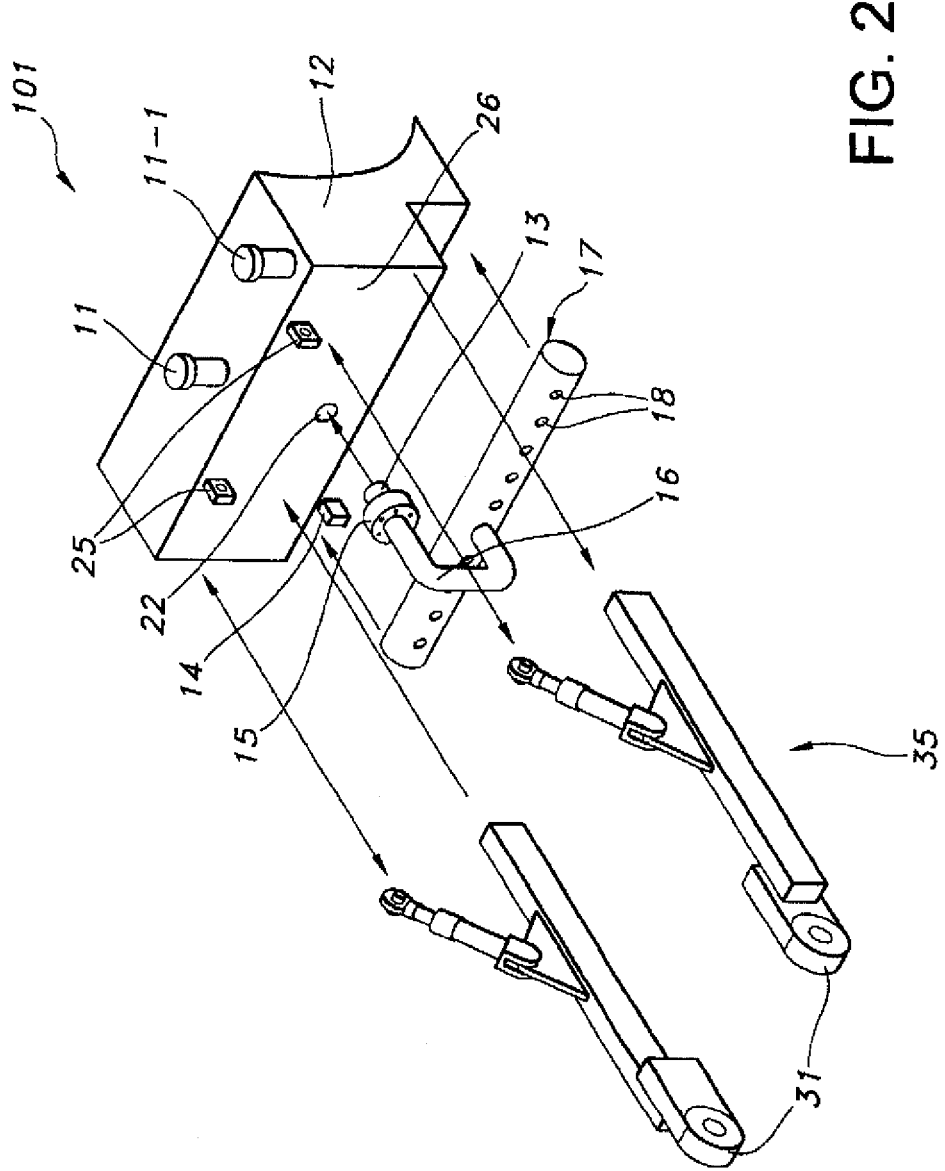
FIG. 2 is a perspective view of an apparatus of the present invention showing attachment means.

FIG. 2 shows an apparatus 101 that can be connected to a working face vehicle. This embodiment functions, for example, as the blade of a bulldozer 202 and 301 as shown on FIG. 3 and FIG. 4, respectively. The apparatus 101 can be directly attached to different vehicles through a plurality of connectors 25, such as a lift cylinder connector positioned on the back side surface 26 of storage tank 12. The front side surface 27 as shown on FIG. 5 of storage tank 12 is configured to form a blade that can be curved at the lower edge. The vehicles 202 and 301 include a plurality of attachment. means 35 to reversibly connect with the connector 25. An example of an attachment means 35 is a push bar 31.

The apparatus 101 is connected to a working face vehicle in the followings ways. The apparatus 101 can be made as an integral part of the working face vehicle, connected by attachment means, or mounted on a trailer and connected to the working face vehicle by a hitch or other means.

In one preferred embodiment of the invention, as illustrated in FIG. 3, a apparatus 101 is located on the back end of a working face vehicle, such as a track driven vehicle 202 i.e. dozer. The track driven vehicle 202 is connected by connectors 43 to the side surface 26 of storage tank 12 of apparatus 101 and the attachment means which are counter weight attachment points (not shown). Alternatively, as shown above, an apparatus 101 is located on the front end of the working face vehicle 202 and the apparatus 101 is attached to the vehicle through attachment means 35.

In another embodiment of the invention, FIG. 4 shows the apparatus 101 installed on various locations of a dozer 301. The apparatus 101 is installed in the front 302 and back 303 of a dozer 301.

In yet another embodiment of the invention, FIG. 5 shows the apparatus 101 on various locations of a wheel driven vehicle 401. The apparatus 101 is installed in the front 405, middle 402, and back 403 of track driven vehicle 401.

Once the present invention is connected on a working face vehicle, the method of distributing waste treatment liquid over solid waste disposal site and compacting solid waste in a landfill may be followed by the steps below.

Step One: fill the storage tank 12 with liquid such as leachate from an inflow conduit 11 located on the top of the storage tank 12 through an inlet end 20. This could be handled by pumping a liquid, such as leachate, into the storage tank 12 or filling the storage tank 12 from an elevated source of liquid (like a dust control tank).

Step Two: once the storage tank 12 is full then the vehicle, such as compactor 301 or track driven vehicle 401, would move out into the working face area 51. The vehicle operator will determine what area of the working face is in need of more moisture for a number of different reasons.

Step Three: after the operator determines an area that needs the moisture, he will move the vehicle over the area. Then he would use the control valve 15 through a control system 14 that is able to be operated from inside the cab of the vehicle to release liquid, such as leachate, from manifold 17 to moisturize the solid waste. The rate of discharge will be controlled by the operator as needed.

Step Four: once the working area needing moisture is as saturated as determined by the operator, the operator would be able to close the control valve 15 through a control system 14 and hold the remaining liquid in storage tank 12.

Step Five: the operator(s) will continue to add layers of waste and then go back to Step Three.

Step Six: once the on storage tank 12 is empty, the operator will return to the loading location and start back at Step One.

This process would be repeated several times throughout the working shift/day. On days of heavy rain or extreme cold weather it would be sufficient to just complete Step One and leave the on storage tank 12 loaded for the extra weight on the compaction vehicles as needed.

It is anticipated that the increased compaction rates obtainable with this invention will yield extra revenues in the same air space. The amount of increased compaction and savings can be seen in Table 1 to Table 6.

The following tables incorporate a couple of different variables of landfill airspace utilization (tons per day and a possible change in pounds per cubic yard compaction) and shows the financial effect on the landfill with small improvements in the compaction ratios that this invention might provide. In describing the present invention some terms referred in the tables are defined as follows:

Depletion: In the landfill industry this is considered the recognition of the cost of landfill development and construction. It is generally based on a per ton rate, which means if a landfill is considered to hold 500 tons of waste and the development and construction cost was $1,000 then the depletion rate would be $2.00 per ton.

Closure/Post Closure: In the landfill industry this is considered to be the setting aside a determined amount of funds to properly close the landfill once it is full and to take care of the landfill facility for a term of approx. 30 years after it is closed. Meaning if it is determined that the closure will cost $1 million and 30 years of care will cost $500,000 then the total fund needed would be $1.5 million. Now if it is determined that the landfill would hold a grand total of 750,000 tons then the landfill company would be required to set aside $2.00 from every ton to cover these expenses.

Gate Rate: In the landfill industry this is considered the publicly published rate for disposal. It could be by the ton, by the cubic yard, or by the load.

EBITDA: In the landfill industry this means "Earnings Before Interest Taxes Depletion Amortization."

Airspace: In the landfill industry this is a term that is used to describe useable volumetric capacity of landfill space for the disposal of waste.

TABLE 1

| Assumptions | |
|---|---|
| 1,400 | Pounds per cubic yard currently |
| $4.00 | Per ton for Depletion and Closure/Post Closure |
| $15.00 | Per ton gate rate for revenue |
| 1,000 | Tons per day Monday through Friday |
| 260,000 | Tons per year |
| 50 | Pounds per cubic yard: Increased compaction using present invention |
| 1,450 | Pounds per cubic yard New Compaction Rate |
| 371,429 | Current cubic yards consumed per year |
| 358,621 | New cubic yards consumed per year |
| 12,808 | Cubic yards saved per year |
| 9,286 | Extra Tons available in the same airspace. |
| $37,143 | Depletion and Closure/Post Closure savings per year |
| $139,286 | Extra Revenue in the Same Airspace |
| 50% | Average EBITDA of Landfill Airspace |
| $69,642.86 | EBITDA Savings per year |
| $50,000.00 | Assumed cost of present invention |
| 8.7 | Pay Back Rate in months |

TABLE 2

| Assumptions | |
|---|---|
| 1,400 | Pounds per cubic yard currently |
| $4.00 | Per ton for Depletion and Closure/Post Closure |
| $15.00 | Per ton gate rate for revenue |
| 1,000 | Tons per day Monday through Friday |
| 260,000 | Tons per year |
| 100 | Pounds per cubic yard: Increased compaction using present invention |
| 1,500 | Pounds per cubic yard New Compaction Rate |
| 371,429 | Current cubic yards consumed per year |
| 346,667 | New cubic yards consumed per year |
| 24,762 | Cubic yards saved per year |
| 18,571 | Extra Tons available in the same airspace. |
| $74,286 | Depletion and Closure/Post Closure savings per year |
| $278,571 | Extra Revenue in the Same Airspace |
| 50% | Average EBITDA of Landfill Airspace |
| $139,286 | EBITDA Savings per year |
| $50,000 | Assumed cost of present invention |
| 4.4 | Pay Back Rate in months |

TABLE 3

| Assumptions | |
|---|---|
| 1,400 | Pounds per cubic yard currently |
| $4.00 | Per ton for Depletion and Closure/Post Closure |
| $15.00 | Per ton gate rate for revenue |
| 1,000 | Tons per day Monday through Friday |
| 260,000 | Tons per year |
| 150 | Pounds per cubic yard: Increased compaction using present invention |
| 1,550 | Pounds per cubic yard New Compaction Rate |
| 371,429 | Current cubic yards consumed per year |
| 335,484 | New cubic yards consumed per year |
| 35,945 | Cubic yards saved per year |
| 27,857 | Extra Tons available in the same airspace. |
| $111,429 | Depletion and Closure/Post Closure savings per year |
| $417,857 | Extra Revenue in the Same Airspace |
| 50% | Average EBITDA of Landfill Airspace |
| $208,929 | EBITDA Savings per year |
| $50,000 | Assumed cost of present invention |
| 2.9 | Pay Back Rate in months |

TABLE 4

| Assumptions | |
|---|---|
| 1,400 | Pounds per cubic yard currently |
| $4.00 | Per ton for Depletion and Closure/Post Closure |
| $15.00 | Per ton gate rate for revenue |
| 1,500 | Tons per day Monday through Friday |
| 390,000 | Tons per year |
| 50 | Pounds per cubic yard: Increased compaction using present invention |
| 1,450 | Pounds per cubic yard New Compaction Rate |
| 557,143 | Current cubic yards consumed per year |
| 537,931 | New cubic yards consumed per year |
| 19,212 | Cubic yards saved per year |
| 13,929 | Extra Tons available in the same airspace. |
| $55,714 | Depletion and Closure/Post Closure savings per year |
| $208,929 | Extra Revenue in the Same Airspace |
| 50.00% | Average EBITDA of Landfill Airspace |
| $104,464 | EBITDA Savings per year |
| $50,000 | Assumed cost of present invention |
| 5.8 | Pay Back Rate in months |

TABLE 5

| Assumptions | |
|---|---|
| 1,400 | Pounds per cubic yard currently |
| $4.00 | Per ton for Depletion and Closure/Post Closure |

TABLE 5-continued

Assumptions

| | |
|---|---|
| $15.00 | Per ton gate rate for revenue |
| 1,500 | Tons per day Monday through Friday |
| 390,000 | Tons per year |
| 100 | Pounds per cubic yard: Increased compaction using present invention |
| 1,500 | Pounds per cubic yard New Compaction Rate |
| 557,143 | Current cubic yards consumed per year |
| 520,000 | New cubic yards consumed per year |
| 37,143 | Cubic yards saved per year |
| 27,857 | Extra Tons available in the same airspace. |
| $111,429 | Depletion and Closure/Post Closure savings per year |
| $417,857 | Extra Revenue in the Same Airspace |
| 50.00% | Average EBITDA of Landfill Airspace |
| $208,929 | EBITDA Savings per year |
| $50,000 | Assumed cost of present invention |
| 2.9 | Pay Back Rate in months |

TABLE 6

Assumptions

| | |
|---|---|
| 1,400 | Pounds per cubic yard currently |
| $4.00 | Per ton for depletion and closure/post closure |
| $15.00 | Per ton gate rate for revenue |
| 1,500 | Tons per day Monday through Friday |
| 390,000 | Tons per year |
| 150 | Pounds per cubic yard: Increased compaction using present invention |
| 1,550 | Pounds per cubic yard New Compaction Rate |
| 557,143 | Current cubic yards consumed per year |
| 503,226 | New cubic yards consumed per year |
| 53,917 | Cubic yards saved per year |
| 41,786 | Extra Tons available in the same airspace. |
| $167,143 | Depletion and Closure/Post Closure savings per year |
| $626,786 | Extra Revenue in the Same Airspace |
| 50.00% | Average EBITDA of Landfill Airspace |
| $313,393 | EBITDA Savings per year |
| $50,000 | Assumed cost of present invention |
| 1.9 | Pay Back Rate in months |

It is intended that the foregoing description is only illustrative of the present invention and that the present invention be limited only by the hereinafter appended claims.

The invention claimed is:

1. A method to apply waste treatment liquid to a solid waste disposal site comprising the steps of:
   connecting a vehicle for solid waste compacting with an apparatus for distributing leachate over a working face of a solid waste disposal site said apparatus comprising:
   an inflow conduit to receive inflow leachate;
   a storage tank for the leachate received from said inflow conduit, the storage tank forming a blade for the vehicle;
   an outflow conduit for the leachate to flow out of said storage tank;
   a control valve that contains a remote-valve control, said storage tank including an outlet opening positioned to allow the leachate to gravity feed through said outflow conduit;
   a manifold inlet conduit attached to the said control valve to allow leachate to flow through when the said control valve opens, and an unpressurized manifold to allow the leachate received from the manifold inlet conduit to be distributed over the working face;
   filling said storage tank with leachate; and
   releasing said leachate in the liquid form from said tank to a portion of said site in need of moisture.

2. The method of claim 1 wherein a rate of discharge of said leachate is controlled by an operator.

3. A connectable apparatus for distributing leachate over a working face of a solid waste disposal site comprising:
   an inflow conduit to receive inflow leachate;
   a storage tank for the leachate received from said inflow conduit;
   an outflow conduit for the leachate to flow out of said storage tank;
   a control valve that contains a remote-valve control, said storage tank including an outlet opening positioned to allow the leachate to gravity feed through said outflow conduit;
   a manifold inlet conduit attached to the control valve to allow leachate to flow through when the control valve opens, and
   an unpressurized manifold to allow the leachate received from the manifold inlet conduit to be distributed in the liquid form over the working face, the storage tank including a plurality of, connectors adapted to attach to a working face vehicle, wherein said storage tank has a back, front, and side surfaces, said front surface is configured to form a blade for the vehicle.

4. The apparatus of claim 3 wherein
the storage tank includes a plurality of connectors adapted to attach to the working face vehicle.

5. The apparatus of claim 4 wherein the said manifold includes a distribution head and leachate discharge openings to distribute leachate over said working face.

6. The apparatus of claim 4 wherein one of said plurality of connectors include a lift cylinder connector positioned on the apparatus housing at the back side surface.

7. The apparatus of claim 4 wherein said apparatus is installed in-line with a travel direction of said working face vehicle, at a location selected from the group consisting of: front, and back of said working face vehicle.

8. The apparatus of claim 4 wherein the vehicle is a wheel driven vehicle.

9. The apparatus of claim 4 wherein the vehicle is a track driven vehicle.

10. The apparatus of claim 4 wherein one of the plurality of connectors is a push bar.

* * * * *